United States Patent
Bhat (10) Patent No.: US 7,062,516 B2
(45) Date of Patent: Jun. 13, 2006

(54) METHODS, SYSTEMS, AND ARTICLES OF MANUFACTURE FOR IMPLEMENTING A RUNTIME LOGGING SERVICE STORAGE INFRASTRUCTURE

(75) Inventor: Guruprasad Bhat, Nashua, NH (US)

(73) Assignee: Sun Microsystems, Inc., Santa Clara, CA (US)

( * ) Notice: Subject to any disclaimer, the term of this patent is extended or adjusted under 35 U.S.C. 154(b) by 633 days.

(21) Appl. No.: 09/953,899

(22) Filed: Sep. 18, 2001

(65) Prior Publication Data

US 2003/0055808 A1 Mar. 20, 2003

(51) Int. Cl.
*G06F 7/00* (2006.01)
*G06F 17/30* (2006.01)
*G06F 12/00* (2006.01)

(52) U.S. Cl. .............................. 707/202; 707/8; 707/10
(58) Field of Classification Search .................... 707/1, 707/102, 200–204, 8, 10, 3; 709/219, 224, 709/226, 201, 203, 220, 227; 711/203, 117
See application file for complete search history.

(56) References Cited

U.S. PATENT DOCUMENTS

| | | | | |
|---|---|---|---|---|
| 5,778,388 A | * | 7/1998 | Kawamura et al. | 707/203 |
| 5,832,515 A | * | 11/1998 | Ledain et al. | 707/202 |
| 5,832,518 A | * | 11/1998 | Mastors | 707/202 |
| 5,903,898 A | * | 5/1999 | Cohen et al. | 707/204 |
| 6,470,388 B1 | * | 10/2002 | Niemi et al. | 709/224 |
| 6,578,041 B1 | * | 6/2003 | Lomet | 707/102 |
| 6,591,228 B1 | * | 7/2003 | Hall et al. | 702/187 |
| 2001/0034791 A1 | * | 10/2001 | Clubb et al. | 709/238 |
| 2002/0019886 A1 | * | 2/2002 | Sanghvi et al. | 709/318 |
| 2002/0060868 A1 | * | 5/2002 | Lenny et al. | 360/31 |
| 2002/0095524 A1 | * | 7/2002 | Sanghvi et al. | 709/318 |
| 2003/0105732 A1 | * | 6/2003 | Kagalwala et al. | 707/1 |

FOREIGN PATENT DOCUMENTS

JP 03003046 A * 1/1991

* cited by examiner

*Primary Examiner*—Frantz Coby
*Assistant Examiner*—Merilyn Nguyen
(74) *Attorney, Agent, or Firm*—Finnegan, Henderson, Farabow, Garrett & Dunner LLP (57) ABSTRACT

Methods, systems and articles of manufacture consistent with the present invention configure a computing system with a logging service that interacts with implementation objects associated with particular types of storage devices through a storage interface. The implementation objects may include processes used to access the storage devices during logging operations. The logging service may also be configured to adjust which storage device is to be used for logging operations without restarting the computing system. This adjustment may be made through a property file that includes properties specific to individual types of storage devices. The property file may be modified to include new properties by a system administrator or by the logging service during runtime operations of the computing system. The new properties may designate new storage devices to be used by the logging service to perform subsequent logging operations.

42 Claims, 4 Drawing Sheets

METHODS, SYSTEMS, AND ARTICLES OF MANUFACTURE FOR IMPLEMENTING A RUNTIME LOGGING SERVICE STORAGE INFRASTRUCTURE

CROSS-REFERENCE TO RELATED APPLICATIONS

This application relates to U.S. patent application Ser. No. 09/953,901, entitled "METHODS, SYSTEMS, AND ARTICLES OF MANUFACTURE FOR EFFICIENT LOG RECORD ACCESS," filed concurrently with the present application, owned by the assignee of this application and expressly incorporated herein by reference in its entirety.

DESCRIPTION OF THE INVENTION

1. Field of the Invention

This invention relates to managing the resources of a computer system, and more particularly, to methods, systems, and articles of manufacture for dynamically adjusting a logging service storage infrastructure.

2. Background of the Invention

Computer systems have become increasingly more complex. With a variety of peripheral devices and software applications available for use, it has become more complicated for a user or system administrator to manage the resources of computer systems. Computer system resources such as attached devices, network connections, software application, etc., should all be managed to ensure proper and efficient operation of the system they are implemented within. In organizations that use a large number of computer systems remotely distributed, the task of managing the resources for each computer system can be overwhelming.

To address the needs of users and system administrators in charge of managing these distributed systems, the industry has introduced the Web-Based Enterprises Management (WBEM) initiative. WBEM includes a standard for managing systems, networks, users and software applications through the use of Internet technology. Computer systems that operate management applications developed according to WBEM principles can share management data independently of vendor, protocol, operating system, and management standards.

One known standard for implementing WBEM is the Common Information Model (CIM). CIM is a common data model of a schema for describing the management of information in a network environment and provides a common conceptual framework to classify and define parts of the network environment, and describe how they interact. The model is not bound to a particular implementation and enables distributed system management to take place between management systems and applications.

Typically a client may perform management tasks through a CIM Object Manager (CIMOM) located at a remote server. A CIMOM is a process responsible for handling all CIM related communications between a client and the server where the CIMOM is located. To promote the use of CIM related technologies, vendors may provide a CIMOM as an open source resource, thus allowing it to be shared and used by a number of clients configured in various platforms. Doing so, however, may require the CIMOM to include processes and code that are generic in nature. That is, the code and processes included in the open source CIMOM should be compatible with any number of operating systems used by a client.

The generic nature of an open source CIMOM may affect various services provided to a client. One such service that is affected is a logging service. A logging service may maintain a history of selected events, operations, and/or transactions, that take place during runtime of a computing system and may be recorded as log records in one or more log files. The logging service provided by an open source CIMOM, however, may use a single type of memory device for storing its log files. Accordingly, the CIMOM would not be able to provide logging services in platforms that use various types of storage devices without providing a separate logging service for each type. For a CIMOM offered as an open source resource, it would be virtually impossible to modify the code of its logging service such that it is compatible with every type of memory device that may be incorporated by platforms. Furthermore, adjusting the logging service to accept new storage devices may require the host computing system to reboot in order to activate changes that reflect these additional storage devices.

SUMMARY OF THE INVENTION

It is therefore desirable to have a method and system that allows a logging service to be configurable to dynamically accept platform specific storage devices during runtime of the platform the service is monitoring.

Methods, systems and articles of manufacture consistent with features of the present invention enable a computing system to adjust, add, and/or delete models of storage devices used for logging operations during runtime operations. In one aspect of the invention, a logging service may be configured to interact with a storage interface that uses implementation objects that are each associated with a particular type of storage device incorporated within the computing system. Each implementation object may be configured to use processes specific to a particular type of storage device and may be used by the logging service to access the storage device.

Additionally, methods, systems and articles of manufacture enable the logging service to dynamically adjust the status of a storage device used by the logging service without shutting down or restarting the computing system. In one aspect of the invention, a property file that contains properties that are specific to certain types of storage devices is used by the log storage interface to associate a logging operation with a corresponding implementation object. Furthermore, the property file may be used to add new storage devices during runtime of the computing system. The property file may be adjusted based on events associated with logging operations that are (or will be) performed by the logging service.

Also, methods and systems consistent with features of the present invention may implement policies that define actions that may be performed by the logging service based on predefined conditions and rules. The actions performed by logging service may include adjusting the property file during runtime operations in order to modify the status of storage devices used for logging operations.

Additional aspects of the invention will be set forth in part in the description which follows, and in part will be obvious from the description, or may be learned by practice of methods, systems, and articles of manufacture consistent with features of the present invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings.

DETAILED DESCRIPTION

Methods, systems, and articles of manufacture consistent with features and principles of the present invention enable a log service to dynamically adjust the status of a log storage device during runtime operations of a computing system that hosts the logging service.

Methods, systems and articles of manufacture consistent with features of the present invention may perform the above functions by using a property file that includes properties that are specific to various types of storage devices. The property file may be modified by a system administrator or by the logging service based on detected events that may or may not be associated with predefined logging policies. The system administrator may define the logging policies prior to, or during, runtime of the computing system. Afterwards, during runtime operations, log requests may be provided to the logging service by components of the computing system. The logging service may access the property file to determine which storage device incorporated by the computing system is activated as a primary log storage device. Once determined, the logging service directs the processed log request to a storage interface configured in accordance with features and principles of the present invention. The storage interface processes the request using a proper implementation object based on the type of storage device indicated in the property file and determined by the logging service. The implementation object may be used to perform the detailed functions associated with the actual access of the storage device to complete the logging operation.

Methods, systems, and articles of manufacture, consistent with features and principles of the present invention, may also allow dynamic adjustments of the property file and policies during runtime of the computing system. In one aspect of the invention, the logging service may detect log service events that may reflect certain logging operations or a current status of an active storage device. When an event is detected, the logging service may determine whether a policy exists that is configured to handle the detected event. If so, the logging service may perform functions defined by the policy. In one aspect of the invention, these functions may include modifying the property file to reflect a new active storage device to be used for subsequent logging operations. The new storage device may have been incorporated into the computing system during runtime operations, and a new implementation object associated with the new storage device may be created. Afterwards, the logging service may perform logging operations using the newly activated storage device via the newly created implementation object.

Additionally, methods, systems, and articles of manufacture consistent with features and principles of the present invention enable a system administrator to adjust the property file when a log service event is detected during runtime of the computing system. The system administrator may access the property file, adjust the properties located therein (or add a new property), and allow the logging service to refresh the property file to activate the changes made. Furthermore, the system administrator may also modify the policies (or add a new one) such that logging service may utilize the modified policy in subsequent logging operations.

Reference will now be made in detail to the exemplary aspects of the invention, examples of which are illustrated in the accompanying drawings. Wherever possible, the same reference numbers will be used throughout the drawings to refer to the same or like parts.

The above-noted features and other aspects and principles of the present invention may be implemented in various environments. Such environments and related applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using an interpreter.

Figure 1:
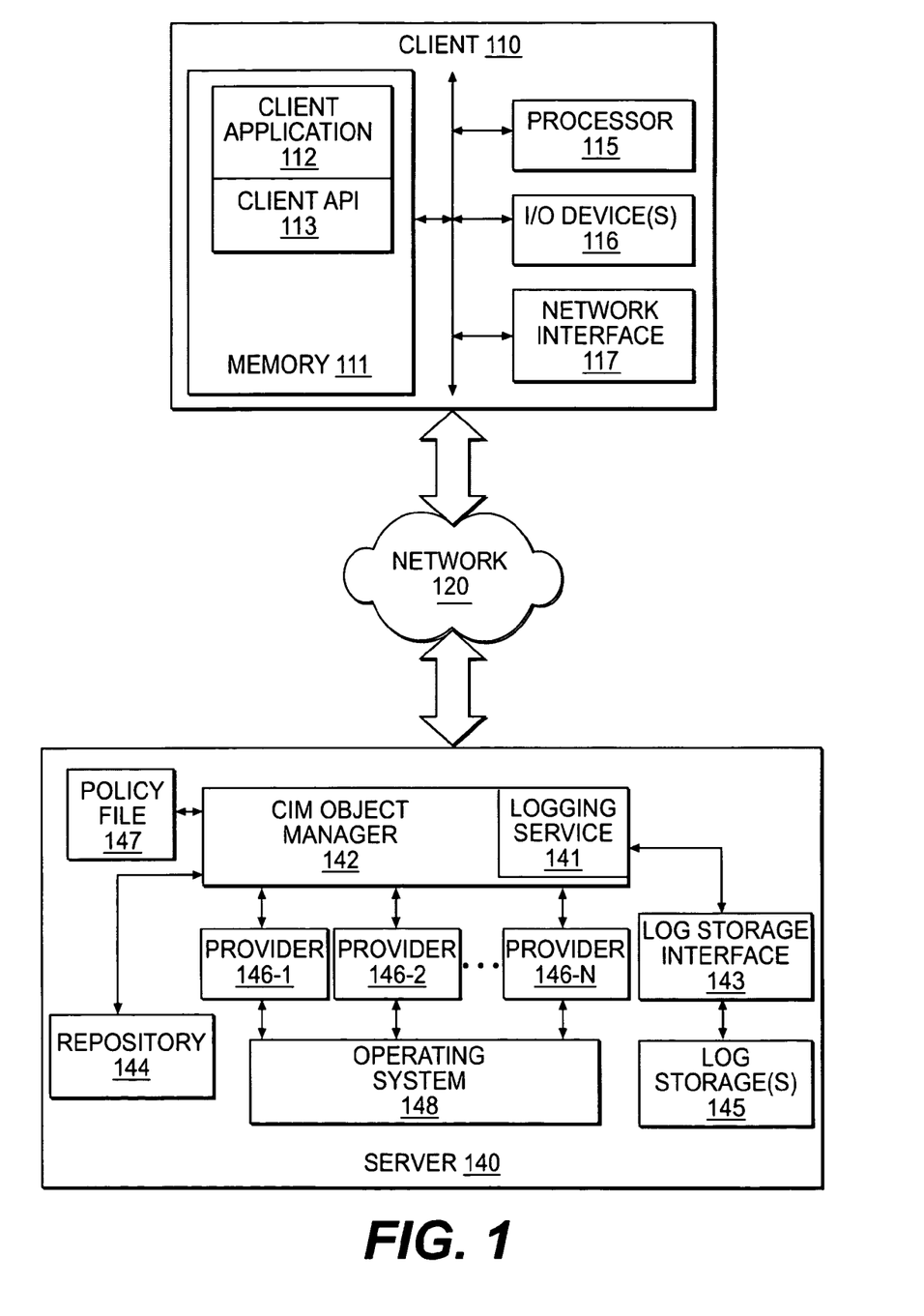
FIG. 1 illustrates an exemplary logging system environment, consistent with features and principles of the present invention.

FIG. 1 illustrates an exemplary system environment in which features and principles consistent with the present invention may be implemented. As shown, FIG. 1 includes a client 110, network 120 and a server 140. Client 110 may include a desktop computer, workstation, laptop, personal digital assistant or any other similar client side system known in the art. For example, client 110 may include a processor 115, associated memory 111, and numerous other elements and functionalities available in computer systems. These elements may include input/output devices 116 such as a keyboard, mouse and display, although in an accessible environment these input means may take other forms. Also, included in client 110 may be a network interface 117 for communicating with network 120. In one aspect of the invention, client 110 may be a CIM configured client. A CIM configured client may be a client that implements CIM standards and techniques to manage resources located at a resource provider, such as a server.

Memory 111 may include, among other things, data (not shown), client application 112 and client API 113. Client application 112 may be a software application configured to analyze and manage resources located in server 140. Client application 112 may manage system aspects such as, for example, disk information (space availability, partitions, etc.), CPU load, event processing, date, time, ports, etc. Client application 112 may also manage specific devices of server 140, such as disks, tape drives, modems, remote I/O devices, and network interfaces. Furthermore, client application 112 may be configured to manage software applications running on server 140 by determining what applications are currently being executed by server 140, what applications are installed, the state of these applications, which applications can be terminated, and performing user and process management. A software developer operating client 110 may use any suitable software tool to develop a management application (client application 112) for processing and displaying data from managed object of server 140.

Client API 113 may be an application programming interface used by client application 112 to communicate with CIMOM 142 located in server 140. Client API 113 may use a variety of communication protocols, including, but not limited to, Remote Procedure Call (RPC), Remote Method Invocation (RMI) and eXtensible Markup Language (XML) over a Hyper-Text Markup Language (HTTP) protocol to communicate directly with CIMOM 142.

In one configuration consistent with certain principles related to the present invention, client API 113 may represent and manipulate CIM objects. These objects may be represented in software written in an object-oriented programming language, such as the Java™ programming language. An object may be a computer representation or model of a managed resource of server 140, such as a printer, disk drive, and CPU. A developer uses the CIM specification to describe managed objects and retrieve information about managed objects in server 140. Further information associated with the CIM specification may be found in the DMTF, Inc. Common Information Model (CIM) Specification, Version 2.2, Jun. 14, 1999, which is expressly incorporated by reference.

Network 120 interconnects client 110 to server 140. Network 120 may include one or more communication networks, including the Internet or any other similar network that supports Web-based processing.

Server 140 may be a computer system having resources that need to be managed such as CPU load, disk space installed applications, etc. Server 140 may include a desktop computer, workstation, or any other similar server side system known in the art. Furthermore, server 140 may include, among other things a CPU, associated memory, and numerous other elements and functionalities available in computer systems (all not shown). Also, software applications may be located in the associated memory and executed by the CPU. As shown in FIG. 1, server 140 further includes a CIMOM 142, repository 144, providers 146-1 to 146-N, and operating system 148.

CIMOM 142 may be a WBEM compliant manager that manages CIM objects that may be represented as object oriented classes written in an object-oriented programming language, such as the Java programming language. Client 110 running client application 112 connects to CIMOM 142, through client API 113 to obtain resource information about server 140. Once connected client 110 receives a reference to CIMOM 142 from which client 110 may then perform WBEM operations using this reference.

CIMOM 142 communicates with either repository 144 or an appropriate provider 146-1 to 146-N, to obtain information about an object requested by client 140. CIMOM 142 may also perform other functions such as setting up communications with repository 144 and providers 146-1 to 146-N to route requests thereto, security checks, and delivering data from providers 146-1 to 146-N and repository 144 to client 110.

Repository 144 maybe a central storage area for CIM classes and instance definitions. In one aspect of the invention, WBEM classes may be stored in repository 144 as specialized objects written in an object oriented language, such as the Java programming language. Repository 144 may be located within server 140 or located remotely.

Providers 146-1 to 146-N may be classes that perform various functions in response to a request from CIMOM 142 and act as intermediaries between CIMOM 142 and one or more managed devices. For instance, providers 146-1 to 146-N may map information from a managed device to a CIM class that may be written in an object oriented language, such as the Java programming language. For exemplary purposes, this CIM class may be referred to as a CIM Java class. Furthermore, providers 146-1 to 146-N may also map information from the CIM Java class to a managed device format. Providers 146-1 to 146-N may supply instances of a given class and support the retrieval, enumeration, modification, and deletion operations associated with managed objects. Furthermore, providers 146-1 to 146-N may supply property values associated with managed objects, such as disk space. Each provider 146-1 to 146-N may be dedicated to a particular type of operation, such as supplying dynamic property values associated with managed objects. Alternatively, providers 146-1 to 146-N may act collectively to process a request received from CIMOM 142. Server 140 may also be configured with only a single provider that handles all communications between CIMOM 142 and operating system 148.

Operating system 148 may be any operating system for computing or data i processing systems of any type, such as the Solaris® operating system from Sun Microsystems, Inc.

Logging service 141 may be a process provided by CIMOM 142 that performs logging operations consistent with features and principles of the present invention. The logging operations may be associated with storing data corresponding to transactions, operations and events that occur during runtime of server 140 and its components, such as CIMOM 142. The term "runtime" may be associated with the execution of processes, applications, or services by server 140, CIMOM 142, operating system 148, and providers 146-1 to 146-N. Also, the term "runtime" may be associated with the condition of not requiring a restart or reboot of processes, applications, services, and/or components consistent with features and principles of the present invention. Additionally, "runtime" may also be associated with the execution of processes, application, or services by entities other than that shown in FIG. 1, such as a CPU or controller. Furthermore, the term "runtime" may not be limited to the actual execution of a process, application, or event, but may also be associated with data transfers, transactions, idle operations, and any other state that server 140 and its components may be in after start-up and initialization and may not require a restart of the computer system.

Logging service 141 may be able to directly communicate with providers 146-1 to 146-N to perform logging operations associated with operations performed by the providers.

Logging service 141 may store data associated with any event, transaction, operation, or the like, between providers 146-1 to 146-N and CIMOM 142. Furthermore, logging service 141 may be configured to perform logging operations associated with any component of server 140. For exemplary purposes, the logging operations performed by logging service 141 consistent with features of the present invention will be described with reference to providers 146-1 to 146-N; however, the description may be associated with any other component of server 140, and client 110 as well. It should also be noted that logging service 141 is not limited to being incorporated by CIMOM 142, and may be configured as a separate process in communication with CIMOM 142, or with any other managing process that is implemented by server 140.

Log storage interface 143 may be a process that interacts with logging service 141 to perform functions consistent with features and principles of the present invention. Log storage interface 143 may be configured using the Java programming language, however, any other programming language may be used. In one configuration consistent with certain principles related to the present invention, log storage interface 143 defines the manner by which logging service 141 interacts with log storage(s) 145. Log storage interface 143 may include a list of methods that logging service 141 assumes will be available for it to call into a storage implementation object that may be plugged into the infrastructure at runtime. Log storage interface 143 may be implemented within CIMOM 142, logging server 141, or may be a process located remotely. Additionally, log storage interface 143 may be configured remotely from server 140 and accessed by logging service 141 through remote process communication techniques known in the art.

Log storage(s) 145 may be one or more devices used for storing data collected during logging operations performed by logging server 141. Log storage device(s) 145 may be any type of storage device that is capable of storing data, including, but not limited to, a semiconductor type memory (i.e., RAM, ROM, SRAM, DRAM, EPROM, etc.), a magnetic disk type memory, a magnetic tape type memory, and an optical disk type memory. Additionally, log storage(s) 145 may be any combination of various types of storage devices. Log storage(s) 145 may include log files that are locations that store data associated with selected logging operations, such as log records. Log records may include data associated with an operation, transaction, and/or event that logging service 141 is to log. The log files may be distributed across a plurality of log storage device(s) 145, or may be located within a single device. Furthermore, the log files may be segregated by logging service 141 based on particular criteria, including, but not limited to, the type of logging operation performed, a type of data in a log record, and the source of the log request received by logging service 141.

Policy file 147 may be a file that includes one or more processes that are configured by a system administrator to manage the behavior or operations of functions performed by CIMOM 142, logging service 141, log storage interface 143, providers 146-1 to 146-N, and any other component within server 140. A system administrator may be a user that manages and/or oversees the hardware, software, and network operations of server 140. Alternatively, a system administrator may be a user that has access to the components of server 140, including CIMOM 142.

In one configuration consistent with certain principles related to the present invention, policy file 147 may be configured under a CIM Core Policy Model that enables a system administrator to represent and manage policies associated with CIM objects managed by CIMOM 142. The CIM Core Policy Model may include policy groups, rules, condition, and action classes that may be used by a system administrator to represent different types of policies. Policy groups may be associated with a policy defined for a group of common objects or processes. The basis for the commonality of these objects may vary and are not intended to be associated with identical features of the objects, although they may be. A set of conditions associated with a policy rule may be specific when the policy rule is applicable. Additionally, policy actions that may, or may not, modify the state of a storage device object may be executed based on the policy rules and conditions. The policy rules may be prioritized, thus allowing a certain rule to supercede another when certain conditions are met. In one aspect of the invention, the policy file includes policies associated with logging operations performed by logging service 141. For more information associated with the CIM Core Policy Model, see "CIM Core Policy Model," DMTF Specification, Feb. 5, 2000, pages 1–21, which is herein incorporated by reference.

Although FIG. 1 shows a single client 110, it should be noted that more than one client 110 may be in communication with server 140. Furthermore, a plurality of servers 140 may also be used with one or more clients 110 to perform functions consistent with features and principles of the present invention. Additionally, client 110 and server 140 may be located in the same computer system, with communications between the two facilitated by a communication bus or link. Also, server 140 may execute software applications and processes that perform tasks similar to that of client 110. Accordingly, these applications and processes may provide requests to CIMOM 142 associated with a managed resource as well. Furthermore, methods, systems and articles of manufacture consistent with features of the present invention are not limited to CIMOM 142 receiving requests from client 110 alone. Requests from other sources, such as components within server 140 and entities outside of server 140 may be processed by CIMOM 142.

It should also be noted that systems, methods, and articles of manufacture are not limited to the configuration depicted in FIG. 1. That is, computing systems, such as server 140 and client 110, may be implemented in environments other than a CIM configured environment. For exemplary purposes, description of systems and methods of the present invention will be associated with the system environment shown in FIG. 1. As noted above, however, the following description of methods, systems, and articles of manufacture consistent with features of the present invention may be employed in other configurations without departing from the scope of the invention.

Figure 2:
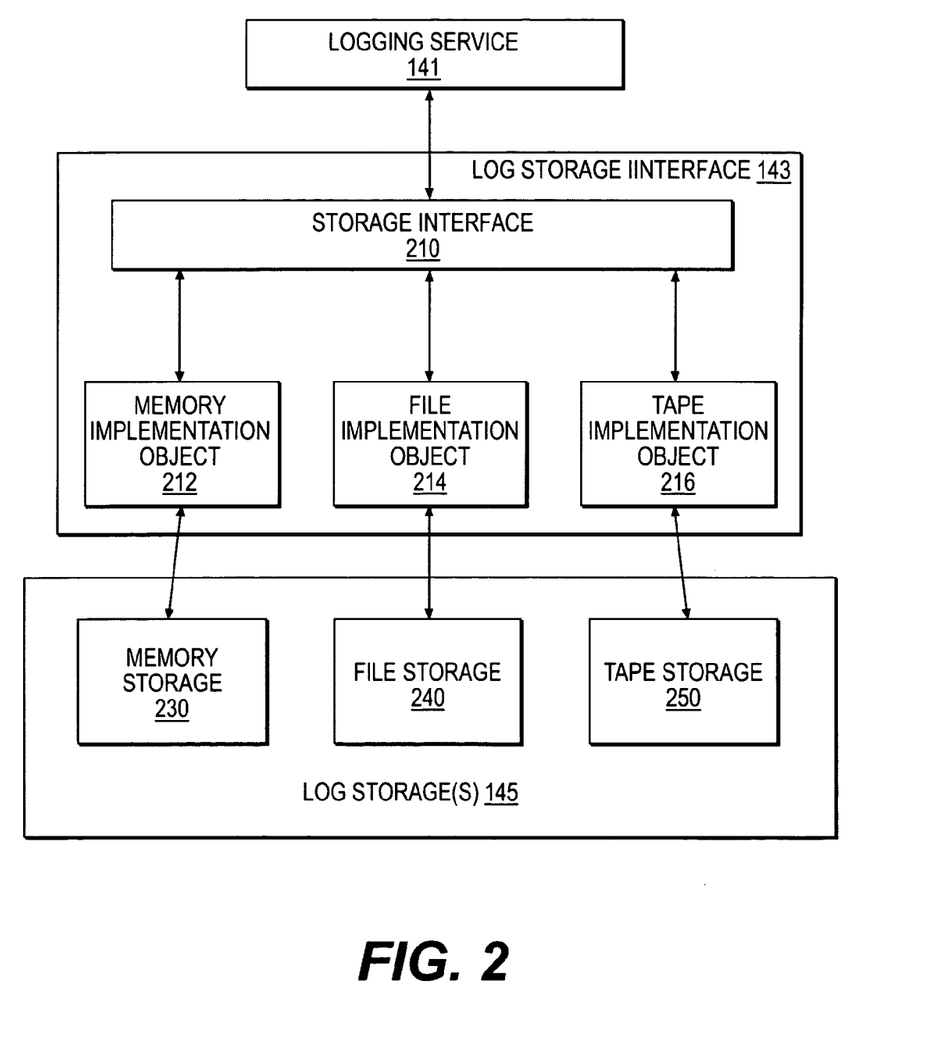
FIG. 2 illustrates an exemplary block diagram of a logging service interface, consistent with features and principles of the present invention.

CIMOM 142, and its functionalities, such as logging service 141, may be provided by a vendor (not shown) over network 120 to server 140. Server 140 may download or retrieve CIMOM 142 from the vendor using well known network data transfer means, or in the alternative, receive CIMOM 142 as program code on a computer-readable storage medium. A user, such as a system administrator, may incorporate CIMOM 142 within server 140 and configure it to operate with operating system 148, whatever type it may be. In one configuration consistent with certain principles related to the present invention, logging service 141 may provide a configurable logging storage infrastructure that enables server 140 to implement practically any type of log storage device 145 prior to, and during, runtime. FIG. 2 illustrates an exemplary block diagram of log storage interface 143 and its relationship with logging service 141 and log storage(s) 145 that may be implemented by the present invention.

As shown in FIG. 2, log storage interface 143 provides an interface between logging service 141 and log storage device(s) 145. Log storage interface 143 may include a storage interface 210, and implementation objects, such as memory implementation object 212, file implementation object 214, and tape implementation object 216. Furthermore, log storage interface 143 may include a list of methods that may be used by logging service 141 during a logging operation. Storage interface 210 may be a process that is configured to recognize logging operations that are processed by logging service 141, and direct the operations to an appropriate implementation object 212, 214, and 216, based on the logging operations. In one configuration consistent with certain principles related to the present invention, storage interface 210 may be configured to receive logging operation requests from logging service 141 that designate a type of log storage device to be used to store log records. Storage interface 210 may process the requests by using implementation objects 212–216 to access an appropriate storage device 230–250 based on information included within the requests.

Implementation objects 212–216 may be objects that implement one or more of the methods that may be included within log storage interface 143. Implementation objects 212–216 may call the one or more methods to process a requested logging operation and communicate with a particular type of storage device 145. For instance, as shown in FIG. 2, memory implementation object 212 may be configured to interface with memory storage device 230; file implementation object 214 may be configured to interface with file storage device 240; and tape implementation object 216 may be configured to interface with tape storage device 250. The term "memory" used with memory implementation object 212 and memory storage device 230 may be associated with semiconductor type memories, such as RAM, ROM, SRAM, DRAM, DRAM, EPROM, NVRAM, or the like. The term "file" used in conjunction with file implementation object 214 and file storage device 240 may be associated with magnetic disk devices. And, the term "tape" used in conjunction with tape implementation object 216 and tape storage device 250 may be associated with magnetic tape storage devices. It should be noted, however, that the above examples are not intended to be limiting and any number of various types of storage devices, such as optical disks, (and their associated implementation objects) may be implemented by systems and methods consistent with features of the present invention, without departing from the scope of the invention.

In one configuration consistent with certain principles related to the present invention, implementation objects 212–216 may be configured as instances of classes written in any object oriented programming language, such as the Java programming language. These instances may incorporate the necessary methods and codes needed to interact and exchange information with respective storage devices 230–250. Furthermore, storage devices 230–250 may be represented as objects of storage device classes that manage the communications with a particular storage device. Alternatively, implementation objects 212–216 may be located elsewhere where logging service 141 may have access to them.

Figure 3:
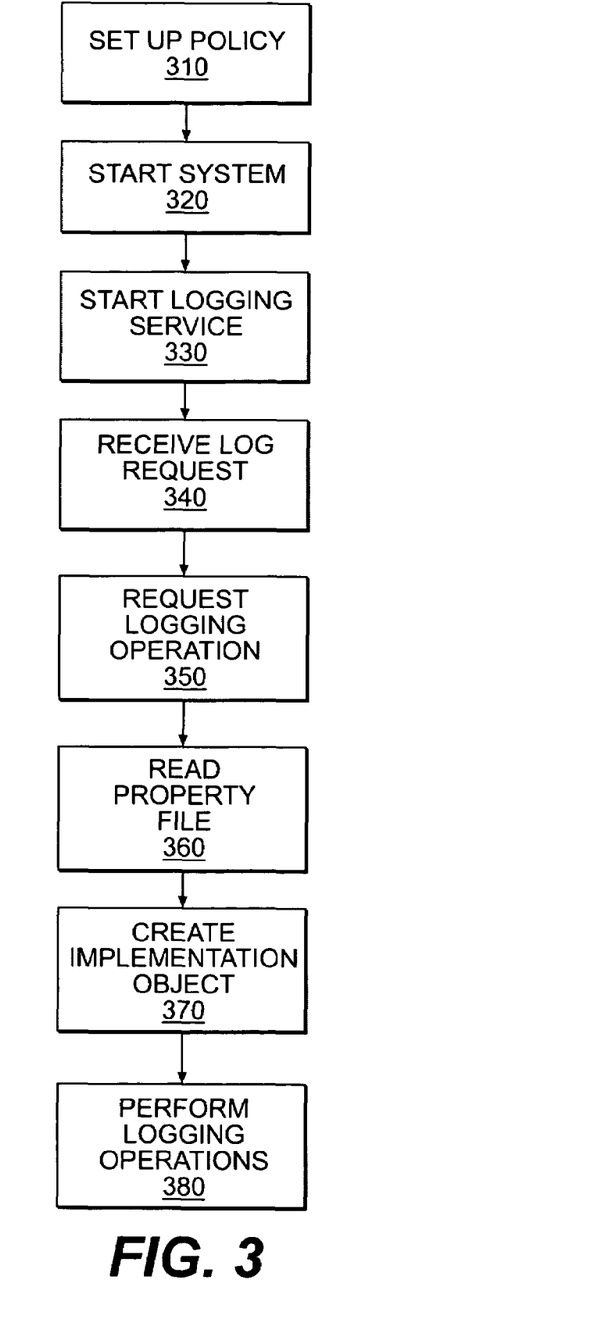
FIG. 3 illustrates a flowchart of an exemplary process performed by a logging service, consistent with features and principles of the present invention.
Figure 4:
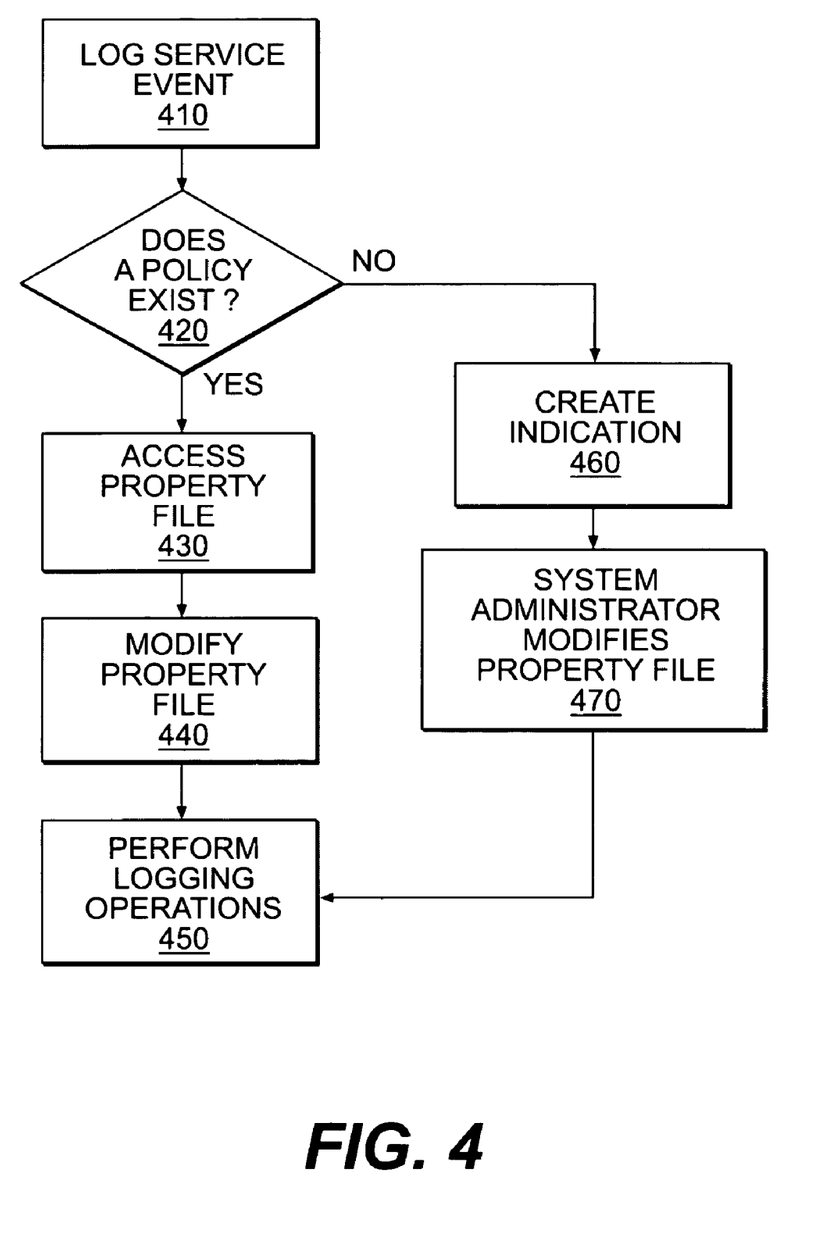
FIG. 4 illustrates another flowchart of an exemplary process performed by a logging service, consistent with features and principles of the present invention.

To better describe the present invention, FIGS. 3 and 4 illustrate exemplary processes that may be performed by server 140, consistent with features of the present invention.

Although the following description is directed to the CIM configured environment illustrated in FIG. 1, one skilled in the art would recognize that methods, systems, and articles of manufacture consistent with features of the present invention may be directed to non-CIM configured environments. Accordingly, the exemplary processes described below may be implemented in various system configurations that do not use CIM methodologies, without departing from the scope of the invention. As described, CIMOM 142 may be provided by a vendor and installed in server 140 by a system administrator. After installation, the system administrator may, among other things, set up logging policies within policy file 147 (Step 310). The logging policies may include a variety of rules, conditions, and actions that enable logging service 141 to perform logging operations as defined by the system administrator's management scheme. For example, a system administrator may create log policies that direct all logging operations received by logging service 141 with a particular timestamp to be directed to a selected storage device, such as a file storage device. For instance, a policy may be defined that directs logging operations received after midnight to a tape storage device instead of a memory storage device previously used by logging service 141. Other examples of logging policies may include directing backup logging operations to a tape memory device, replacing an active storage device with another storage device when the active storage device is running out of, or ran out, of memory space, and prioritizing various storage devices used by server 140 to allow logging service 141 to direct log records to selected storage devices based on predetermined conditions. Of course, other logging policies that are associated with various conditions, rules, and storage devices may be configured by a system administrator and stored in policy file 147, and methods and systems consistent with features of the present invention are not limited to the examples above.

Returning to FIG. 3, once the logging policies are created by a system administrator, the server system is started (Step 320), and subsequently CIMOM 142 starts up logging service 141 in preparation for performing logging operations consistent with features and principles of the present invention (Step 330). During server 140 runtime operations, CIMOM may receive requests for performing CIM related operations from client 110 (Step 340). Alternatively, the requests may originate from sources other than client 110, such as an application or process executed within server 140.

When CIMOM 142 receives a request, it may be processed using either a provider 146-1 to 146-N or repository 144. The request is processed based on its type and whether information associated with the request may be obtained from repository 144 or not. In the event the information needed to process the request is not found in repository 144, CIMOM 142 may use provider 146-1 to 146-N to locate the system information necessary to handle the request (if possible). Once the appropriate destination is located, CIMOM 142 eventually receives a result corresponding to the routed request and forwards the results back the source of the request, such as client 110.

In one configuration consistent with certain principles related to the present invention, providers 146-1 to 146-N and/or CIMOM 142 may request logging operations from logging service 141 while processing a request (Step 350). For instance, in the event a provider 146-1 to 146-N handles a request from CIMOM 142, it may request that logging service 141 create a log record associated with any transactions and/or operations performed while processing the request. Alternatively, logging service 141 may be configured to monitor the operations of providers 146-1 to 146-N and recognize when a log record is to be created based on logging policies defined in policy file 147 without waiting for a log request. In one aspect of the invention, the requests for logging operations may include, but is not limited to, writing to a log file, deleting a log record, deleting a log file, reading a log record, creating a backup copy of a log record, creating a backup copy of a log file, and a request to list all records in a log file.

When logging service 141 receives a logging operation request, it may perform the operations necessary to create a log record associated with the particular type of transaction (and/or operation, event) performed by provider 146-1 to 146-N. For example, a log record may be formed to include a variety of fields including, but not limited to, timestamp data that reflects a time when the transaction occurred, description data that reflects the type of transaction, a log record identifier for locating the log record, data associated with components and/or processes involved with the transaction, error and/or event messages associated with the transactions, and any other information associated with the transaction that may be used by server 140 and its components. The operations performed by logging service 141 in preparation for storing the log record in a particular log file may include determining the location of the log file, and what type of storage device to place the log record in.

In one configuration consistent with certain properties related to the present invention, CIMOM 142 may use property files that may be located in CIMOM 142 or repository 144. The property files may be written in a number of different programming languages, including object oriented programming languages, such as the Java programming language. The property file may include a property called DataStoreImpl that may be used to define particular types of storage devices used by server 140. A DataStoreImpl property may be defined by a system administrator and stored within the property file prior to starting server 140. For example, if server 140 is initially configured with only file storage devices for logging operations, the system administrator may edit the property file to define a DataStoreImpl property specific to file storage type devices. In one aspect of the invention, a DataStoreImpl property may be defined as:

DataStoreImpl=com.sun.log.filelog, where ".filelog" may be an extension that identifies an implementation object, such as file implementation object 214, that may be used to store log record in log storage(s) 145.

Alternatively, the system administrator may designate other types of storage devices such as memory and tape storage devices by respectively adjusting the DataStoreImpl property as:

DataStoreImpl=com.sun.log.memlog; or
DataStoreImpl=com.sun.log.tapelog.

The DataFileImpl property may designate which implementation object should be used by logging service 141 while processing a logging operation. Accordingly, methods, systems, and articles of manufacture consistent with features of the present invention may assign the DataFileImpl property a particular name that is associated with a particular implementation object. It should be noted that the actual names defined in the property file may vary and are not limited to the above examples. For instance, assume that log storage interface 143 has been defined with the appropriate methods for performing logging operations. Further assume that three classes written in the Java programming language that implement log storage interface 143 have been defined as well. These three classes, for exemplary purposes, may be named:

com.sun.foo.bar.FileStorageImpl;
com.sun.foo.bar.PapyrusStorageImpl; and
com.sun.foo.bar.TapeStorageImpl.

In the above example, the DataFileImpl property may be assigned any one of the above three class names, from which logging service 141 may use to perform requested logging operations.

Furthermore, there may be more than one DataStoreImpl property defined in the property file that designate the various storage devices used by server 140. Also, the property file may be associated with logging policies by the system administrator such that the DataStoreImpl properties for the various storage devices are prioritized. For example, the property file may include various versions of a memory storage device log that reflect different storage devices of the same type. Alternatively, the property file may prioritize the DataStoreImpl properties based on storage device types, and maybe, conditions set forth by a logging policy defined in policy file 147. For example, in a property file that includes the following properties:

com.sun.log.memlog1.1;
com.sun.log.memlog2.4;
com.sun.log.tapelog1.3; and
com.sun.log.filelog1.2, the ".1" extension in the memlog1.1 property may indicate a memory storage device that has first priority. Accordingly, logging service 141 may default to its use for logging operations unless instructed otherwise. For instance, in the event the top three priority storage devices defined in the above exemplary property file are unavailable, logging service 141 may use the storage device with the lowest priority to perform logging operations, which is the second memory storage device reflected by the memlog2.4 property. It should be noted that the extensions described above are exemplary and are not intended to be limiting. One skilled in the art would recognize that any name with various extension identifiers may be used without departing from the scope of the invention.

Returning back to FIG. 3, following the operations performed by logging service 141 in preparation for logging a log record, the property file is accessed from CIMOM 142 or repository 144 (Step 360). Logging service 141 determines from the accessed property file which (if more than one is designated) storage device is activated by the DataStoreImpl property, and uses this information to request a logging operation to be performed based on the activated storage device type. The logging operation request may include the property data determined by logging service 141. The logging operation request created by logging service 141 may be directed to storage interface 210, which in turn may use the DataStoreImpl property data to create an appropriate inplementation object 212–216 (Step 370). Storage interface 210 may provide a handle (i.e., a reference) associated with the created inplementation object 212–216 to logging service 141. Accordingly, logging service 141, storage interface 210, and the created implementation object 212–216 may collectively perform the necessary operations to interface with the storage device 230–250 and allow the logging operations to proceed (Step 380). Logging service 141 may use the handle to load or invoke the inplementation object associated with a storage device activated in the property file, thus allowing logging operations to complete. Alternatively, storage interface 210 may be configured to use a loaded inplementation object 212–216 to access a storage device 145 and provide information to logging service 141 during, or after, the access.

As described, methods, systems, and articles of manufacture consistent with features and principles of the present invention allow server 140 to designate a storage device 230–250 as the log storage 145 to be used by logging service 141 when performing logging operations. In another aspect of the invention, methods, systems, and articles of manufacture allow logging service 141 to dynamically recognize different storage devices during runtime of server 140. FIG. 4 illustrates an exemplary process associated with the dynamic log storage adjustment features of the present invention.

As shown in FIG. 4, during normal runtime server 140 operations, logging service 141 may perform logging operations, as described with reference to FIG. 3, using a particular storage device, such as memory storage 230. During these logging operations, logging service 141 may receive a log service event from a provider 146-1 to 146-N, repository 144, or any other source) that may indicate that a particular condition has been detected (Step 410). A log service event may indicate to logging service 141 that a condition has occurred that may affect the storage device used by server 140 and logging service 141. For example, at some point during runtime operations, server 140 may be introduced with a new storage device, such as tape storage 250, or a different memory storage device 230, etc. Server 140 may be configured to create a log service event based on an indication that the new storage device is to be used for logging operations. The event may indicate that logging service 141 needs to refresh the property file with a new property that reflects the new storage device. Alternatively, a log service event may be associated with a logging policy. For instance, logging service 141 may be Implementing a logging policy that introduces a log service event when an active storage device is running out of memory. Furthermore, a logging policy may introduce a log service event when a particular type of logging operation is requested by logging service 141, such as a backup logging operation.

Returning to FIG. 4, when a log event is detected, logging service 141 then may determine whether a logging policy exists for the particular event detected (Step 420). Logging service 141 may check policy file 147 to determine whether the log event includes a condition that meets a logging policy criteria. For example, if the log service event is an indication that a storage device will not take any more log records because of memory availability, logging service 141 may determine whether a logging policy exists that is configured to handle this situation. In one configuration consistent with certain principles related to the present invention, there may be a logging policy that instructs logging service 141 to designate another storage device defined in the property file as the active storage device to be used for logging operations based on the memory availability event described above.

If a logging policy does exist (Step 420; YES), logging service 141 may locate and access the property file in CIMOM 142 (or repository 144 if it could not be located in CIMOM 142) (Step 430). Once accessed, the property file is adjusted according to the logging policy (Step 440). The adjustment of the property file may involve resetting a different DataStoreImpl property to indicate a new active property. For example, if the current DataStoreImpl property designates file storage device 240 as the current destination device for logging operations (thus making the file storage device as the active storage device), logging service 141 may select another DataStoreImpl property defined in the property file according to the logging policy, such as one that is associated with tape storage device 250.

In one configuration consistent with certain principles related to the present invention, the adjustment of the property file may be performed by using the refresh interface associated with the Java programming language. This interface may allow the property file to refresh itself once it has been modified. Logging service 141 then may invoke a method associated with the refresh interface that allows the property file (which may be represented as an object in CIMOM 142 or repository 144) to update its current state to the new state designated by logging service 141. After refresh, the property file will activate the new DataStoreImpl property designated by logging service 141. After updating the property file, logging service 141 may perform subsequent logging operations using a newly created inplementation object corresponding to the newly activated storage device (Step 450). In one configuration consistent with certain principles related to the present invention, when a new inplementation object is created based on an activated property in the property file, the inplementation object previously used by logging service 141 may be removed or "de-allocated" using well known file and/or object removal techniques, such as garbage collection. Alternatively, methods, systems, and articles of manufacture consistent with the present invention may cache the previously used inplementation object. In this instance, the cached inplementation object may later be accessed by logging service 141 when a property associated with the cached inplementation object is activated in the property file.

In another configuration consistent with certain principles related to the present invention, logging service 141 may be configured, via a logging policy, to include a new DataStoreImpl property associated with a newly added storage device during runtime of server 140. The new DataStoreImpl property may be associated after a system administrator has updated policy file 147 with a new policy associated with the newly added storage device and its corresponding inplementation object. For example, a system administrator may recognize the addition of a new storage device, such as tape storage device 250 in server 140. Accordingly, the administrator may access policy file 147 to include a new logging policy that instructs logging service 141 to include a new DataStoreImpl property, such as DataStoreImpl=com.sun.log.tapelog, in the property file when a certain event is detected, such as a backup logging operation. When the certain event is detected during runtime of server 140, logging service 141 may check policy file 147, detect the new logging policy, and access the property file to activate the new property. The logging policy may include a condition that designates the newly added storage device as the active storage device. Accordingly, logging service 141 may designate the new property as active, use the refresh interface associated with the property file, create an inplementation object, such as inplementation object 216, and perform the backup logging operations with the newly added tape storage device 250, via the newly created tape inplementation object 216.

Returning to Step 420, if logging service 141 does not detect a logging policy in policy file 147 (Step 420; NO), logging service 141 may be configured to create an indication reflecting the log service event (Step 460). In one aspect of the invention, the indication may be provided in the form of a message to a system administrator. In response to the message, the system administrator may access the property file in CIMOM 142, or repository 144, and modify the property file to incorporate any changes to the DataStoreImpl properties included therein (Step 470). The changes made by the system administrator may include adjusting priorities of DataStoreImpl properties, adding new properties corresponding to a newly added implementation object and storage device, activating a new property associated with another storage device (perhaps by refreshing the property file), and any other form of property file adjustments that may be performed to handle the detected log service event. Once the property file has been adjusted, logging service 141 may be instructed to refresh the property file and perform logging operations according to the activated property defined in the property file (Step 450).

As described, methods, systems, and articles of manufacture consistent with features of the present invention enable a computing system to dynamically insert and adjust models (Implementations) of storage devices used for logging operations during runtime of the computing system. A logging service may use property files to define storage device properties that are used by a log storage interface to perform the processes required to access these devices. The log storage interface may employ the use of the storage device Implementations to perform the logging operations with a particular storage device. Although the configuration of the systems and methods described above allow the present invention to perform runtime log storage device configurations, variations of the methods and systems consistent with features of the present invention previously described may be Implemented without departing from the scope of the invention. For example, methods, systems, and articles of manufacture, consistent with features of the present invention may be Implemented using various network models, and is not limited to a CIM environment. Furthermore, methods, systems, and articles of manufacture, consistent with features of the present invention are not limited to the inplementation of systems and processes compatible with software written in the Java programming language. Any number of programming languages may be utilized without departing from the scope of the present invention.

Also, methods and systems consistent with features of the present invention are not limited to the use of property files to represent the storage devices used by server 140.

Alternate device modeling mechanisms may be employed without departing from the scope of the invention. Additionally, the configuration of the environments shown in FIGS. 1 and 2 are not intended to be limiting. For example, server 140 and client 110 may be located in the same computing system. Furthermore, the components of server 140 may be located remotely from server 140. The present invention is also not intended to be limited to the use of a server to host the logging service processes. Other types of computing systems that may use logging services may employ methods and systems consistent with features of the present invention as well.

Additionally, although aspects of the present invention are described as being associated with data stored in memory and other storage mediums, one skilled in the art will appreciate that these aspects can also be stored on or read from other types of computer-readable media, such as secondary storage devices, like hard disks, floppy disks, or CD-ROM; a carrier wave from the Internet; or other forms of RAM or ROM. Accordingly, the invention is not limited to the above described aspects of the invention, but instead is defined by the appended claims in light of their full scope of equivalents.

What is claimed is:

1. A method in a computer system, comprising:
   performing logging operations using a first storage device associated with the computer system by a first object;
   detecting an event associated with the logging operations; and
   performing subsequent logging operations using a second storage device based on the detected event without restarting the computer system, wherein performing subsequent logging operations comprises:
   creating a second object associated with the second storage device without restarting the computer system, wherein a property file is defined in one of a Common Information Model Object Manager (CIMOM) and a repository, and wherein creating the second object comprises creating the second object based on a property defined in the property file; and
   performing the subsequent logging operations using the second object.

2. The method of claim 1, wherein creating the second object based on the property further comprises:
   activating the property such that another property corresponding to the first storage device is no longer used by the computing system for logging operations.

3. A method for logging data during runtime in a Common Information Model (CIM) configured computer system, comprising:
   receiving a request to perform a logging operation;
   providing a reference to an implementation object associated with a storage device to a logging service, wherein providing a reference comprises:
   determining whether a logging policy associated with the logging operation exists; and
   creating the implementation object based on the logging policy; and
   performing the logging operation using the implementation object such that data is logged in the storage device.

4. The method of claim 3, wherein the logging operation is one of writing to a log file, deleting a log record, deleting a log file, reading a log record, creating a backup copy of a log record, creating a backup copy of a log file, and a request to list all records in a log file.

5. The method of claim 3, wherein providing a reference comprises:
   providing the reference to the logging service based on a logging policy.

6. The method of claim 5, wherein the logging policy comprises one of:
   (i) a policy to associate logging operations directed to backing up data with the storage device;
   (ii) a policy to associate logging operations provided after a predetermined time of day with the storage device;
   (iii) a policy to associate logging operations associated with an unavailable default storage device with the storage device; and
   (iv) a policy to associate logging operations corresponding to error messages with the storage device.

7. The method of claim 5, wherein the logging policy is a policy that detects when a default memory device is running out of memory space, and wherein providing the reference based on the logging policy comprises:
   associating the logging operation with the storage device when the default storage device is running out of memory space.

8. The method of claim 3, wherein the logging service is implemented within a Common Information Model Object Manager (CIMOM).

9. The method of claim 3, wherein the storage device is an object of a CIM class.

10. A method for logging data during runtime in a Common Information Model (CIM) configured computer system, comprising:
receiving a request to perform a logging operation;
providing a reference to an implementation object associated with a storage device to a logging service;
determining whether a logging policy associated with the logging operation exists; and
performing the logging operation using the implementation object such that data is logged in the storage device;
wherein the logging policy is configured to instruct the logging service to deactivate a default property associated with a default implementation object and activate a runtime property associated with the implementation object, and wherein creating the implementation object further comprises:
creating the implementation object based on the runtime property.

11. The method of claim 10, wherein performing a logging operation comprises:
using the implementation object to access the storage device.

12. The method of claim 10, wherein the logging policy is a policy that detects when a default memory device is running out of memory space, and wherein providing the reference further comprises:
associating the logging operation with the storage device when the default storage device has run out of memory space.

13. A method for performing a logging process in a computer system, comprising:
providing, in a property file, a first property reflecting a first storage device;
creating a first object associated with a first storage device based on the first property;
accessing the first storage device to perform a first logging operation using the first object;
providing, in the property file, a second property representing a second storage device during runtime of the computer system;
creating a second object associated with the second storage device based on the second property; and
accessing the second storage device to perform a second logging operation using the second object.

14. The method of claim 13, wherein providing the second property comprises:
detecting an event associated with the first logging operation; and
refreshing the property file with the second property based on the detected event.

15. The method of claim 14, wherein the event associated with one of:
(i) an availability of memory space in the first storage device;
(ii) a type of logging operation; and
(iii) a timestamp associated with the first logging operation.

16. The method of claim 14, further comprising:
detecting a logging policy associated with the event.

17. The method of claim 13, wherein the first and second storage devices are the same type of storage device.

18. The method of claim 13, wherein the first and second storage devices are different types of storage devices.

19. The method of claim 13, wherein at least one of the first and second logging operations comprises one of:
(i) an operation to write to a log file;
(ii) an operation to read a log file;
(iii) an operation to read a log record within a log file;
(iv) an operation to delete a log file;
(v) an operation to create a backup copy of a log file;
(vi) an operation to delete a log record within a log file; and
(vii) an operation to create a backup copy of a log record within a log file.

20. The method of claim 13, wherein the steps of providing the first and second properties are performed by a logging service configured within a Common Information Model Object Manager (CIMOM) and the steps of accessing the first and second storage devices are performed by a process configured to provide an interface between the logging service and the first and second objects.

21. A method for performing a logging process in a computer system, comprising:
providing, in a property file, a first property reflecting a first storage device;
creating a first object associated with a first storage device based on the first property;
accessing the first storage device to perform a first logging operation using the first object;
providing, in the property file, a second property representing a second storage device during runtime of the computer system;
creating a second object associated with the second storage device based on the second property;
accessing the second storage device to perform a second logging operation using the second object; and
detecting a logging policy associated with the event, wherein the logging policy prioritizes the first and second properties such that the second property has a higher priority than the first property.

22. A computer system for processing logging operations, comprising:
a property file defining a first property associated with a first storage device and a second property associated with a second storage device;
a management structure comprising:
(i) a first object associated with the first property,
(ii) a second object associated with the second property, and
(ii) a logging service for processing a first logging operation based on the first property and first object, and modifying the property file to process a second logging operation based on the second property and second object without restarting the computer system; and
an interface for accessing the first storage device during the first logging operation based on the first object, and accessing the second storage device during the second logging operation based on the second object.

23. The system of claim 22, wherein the logging service is configured to detect an event associated with the first logging operation and to modify the property file based on the detected event.

24. The system of claim 23, wherein the logging service is further configured to process a logging policy when the event is detected, wherein the logging policy instructs the logging service to modify the property file.

25. The system of claim 22, wherein the interface is configured to provide a first handle associated with the first object to the logging service based on the first property during the first logging operation and to provide a second handle associated with the second object to the logging service based on the second property during the second logging operation.

26. The system of claim 22, wherein the system is configured to allow a system administrator to add a third property associated with a third storage device to the property file during runtime of the computer system.

27. The system of claim 26, wherein the logging service is configured to process a third logging operation by refreshing the property file with the third property to allow the interface to access the third storage device.

28. The system of claim 27, wherein the system is configured to allow the system administrator to add a third object associated with the third property and the interface accesses the third storage device based on the third object.

29. The system of claim 22, wherein the logging service is configured to add a third property associated with a third storage device to the property file during runtime of the computer system.

30. The system of claim 26, wherein the logging service is configured to process a third logging operation by refreshing the property file with the third property to allow the interface to access the third storage device.

31. The system of claim 27, wherein the logging service is configured to create a third object associated with the third property and the interface accesses the third storage device based on the third object.

32. The system of claim 22, wherein the logging service modifies the property file based on a logging policy.

33. The system of claim 32, wherein the logging policy is one of:
   a policy to associate logging operations directed to backing up data with the second storage device, a policy to associate logging operations provided after a predetermined time of day with the second storage device, a policy to associate logging operations associated with an unavailable default storage device with the second storage device, and a policy to associate logging operations corresponding to error messages with the second storage device.

34. A system for performing logging operations, comprising:
   a logging service for logging data in a first storage device based on a first property stored in a property file, and
   an interface for providing an object associated with the first storage device to the logging service based on the first property,
   wherein the logging service uses the object to log data in the storage device and wherein the logging service may modify the property file without restarting the system in order to log additional data in a second storage device.

35. The system of claim 34, wherein the logging service modifies the property file by activating a second property and the interface provides to the logging service a second object associated with the second storage device based on the second property in order to log the additional data.

36. The system of claim 34, wherein the interface provides a handle associated with the object to the logging service and the logging service loads the object using the handle.

37. The system of claim 34, wherein the logging service modifies the property file based on a logging policy.

38. The system of claim 37, wherein the logging policy directs the logging service to add a new property associated with a new storage device in the property file and use the new property for logging the additional data in the new storage device.

39. The system of claim 38, wherein the interface provides a new object associated with the new storage device to the logging service based on the new property.

40. The system of claim 39, wherein the logging service uses the new object to log data in the new storage device.

41. The system of claim 34, wherein the logging service modifies the property file based on instructions received from a system administrator.

42. The system of claim 41, wherein the instructions include a request to perform a refresh of the property file after the system administrator adds a second property associated with the second storage device in the property file.

* * * * *